US012732509B1

(12) United States Patent
Berger

(10) Patent No.: US 12,732,509 B1
(45) Date of Patent: Sep. 8, 2026

(54) SYSTEMS AND METHODS FOR DELEGATED AUTHORITY MANAGEMENT, RUNTIME ENFORCEMENT, AND REVOCATION IN AUTONOMOUS COMPUTATIONAL ENTITIES

(71) Applicant: RAIN HOLDINGS, INC., Laguna Beach, CA (US)

(72) Inventor: Marc Berger, Laguna Beach, CA (US)

(73) Assignee: Rain Holdings, Inc., Laguna Beach, CA (US)

( * ) Notice: Subject to any disclaimer, the term of this patent is extended or adjusted under 35 U.S.C. 154(b) by 0 days.

(21) Appl. No.: 19/458,253

(22) Filed: Jan. 23, 2026

(51) Int. Cl.
*H04L 9/40* (2022.01)

(52) U.S. Cl.
CPC ........ *H04L 63/108* (2013.01); *H04L 63/0884* (2013.01)

(58) Field of Classification Search
CPC .......................... H04L 63/108; H04L 63/0884
See application file for complete search history.

(56) References Cited

U.S. PATENT DOCUMENTS 5,623,664 A 4/1997 Calvert et al.
5,978,583 A * 11/1999 Ekanadham .......... G06F 9/5077 717/106
6,135,646 A * 10/2000 Kahn .................... G06Q 10/10 709/219
6,675,191 B1 1/2004 Ito
6,996,808 B1 * 2/2006 Niewiadomski ...... G06F 9/4486 714/38.14
8,789,138 B2 * 7/2014 Reierson ................ G06F 9/468 719/329
9,411,964 B1 * 8/2016 Moritz .................. G06F 21/577
9,430,662 B2 8/2016 Giambiagi et al.
9,704,132 B2 * 7/2017 Fraccaroli ............ B60R 16/037
10,205,701 B1 * 2/2019 Voss ........................ H04L 67/02
10,521,330 B2 * 12/2019 Tsantilis .............. G06F 11/3668
10,721,224 B1 * 7/2020 Sheffield ............... H04L 9/0637
10,956,135 B1 * 3/2021 Raphael .................. G06N 5/02
11,321,107 B1 * 5/2022 Eyberg ................ G06F 9/45545
11,356,273 B1 * 6/2022 Patel ....................... H04L 9/088
11,467,913 B1 * 10/2022 Karr ...................... G06F 3/0689
11,550,903 B1 * 1/2023 Epstein ................... G06F 21/57
11,556,862 B2 1/2023 Polleri et al.
11,593,560 B2 2/2023 Zhou et al.
11,593,622 B1 2/2023 Gandhi et al.
11,755,754 B2 9/2023 Joshi et al.
11,775,663 B2 10/2023 Laurance et al.
12,452,369 B1 10/2025 Olejar, Jr. et al.
12,609,832 B1 4/2026 Gordon et al.
(Continued)

*Primary Examiner* — Aravind K Moorthy
(74) *Attorney, Agent, or Firm* — Wilson Sonsini Goodrich & Rosati

(57) ABSTRACT

Described herein are systems, methods, and media for governing delegated execution authority in computational entities. An authority object comprising authority constraints is generated and associated with an autonomous computational entity independently of identity credentials. Proposed actions may be intercepted at runtime and evaluated against the authority object to determine execution eligibility. The execution of the proposed action is controlled by permitting, modifying, delaying, attenuating, redirecting, or suppressing the action. Authority objects may be dynamically modified or revoked with revocation propagating across systems.

23 Claims, 5 Drawing Sheets

(56) References Cited

U.S. PATENT DOCUMENTS

2002/0133699 A1* 9/2002 Pueschel ........ G06F 21/10 713/153
2003/0074090 A1* 4/2003 Becka ........ G06Q 10/10 700/83
2006/0265375 A1* 11/2006 Hess ........ G06F 21/6209 707/999.009
2007/0157155 A1* 7/2007 Peters ........ G06F 8/10 717/100
2008/0126762 A1* 5/2008 Kelley ........ G06F 9/547 709/212
2008/0243607 A1 10/2008 Rohan et al.
2009/0055901 A1 2/2009 Kumar et al.
2009/0094596 A1 4/2009 Kuiper et al.
2009/0183227 A1* 7/2009 Isaacs ........ G06F 9/451 726/1
2009/0288074 A1 11/2009 Carroll et al.
2009/0307466 A1 12/2009 Barsness et al.
2010/0185963 A1* 7/2010 Slik ........ G06F 16/278 715/764
2012/0008159 A1* 1/2012 Takahashi ........ G03G 15/55 358/1.14
2012/0059783 A1* 3/2012 Fiedler ........ A63F 13/358 706/46
2012/0102548 A1* 4/2012 Tamura ........ G06F 21/31 726/4
2013/0111479 A1* 5/2013 Chen ........ G06F 11/3433 718/100
2013/0111484 A1* 5/2013 Chen ........ G06F 11/0757 718/102
2013/0139264 A1* 5/2013 Brinkley ........ G06F 21/54 726/23
2013/0239192 A1* 9/2013 Linga ........ H04L 63/061 726/3
2013/0305387 A1* 11/2013 Fischer ........ G06F 21/6218 726/28
2014/0189889 A1* 7/2014 Winters ........ G06F 21/62 726/30
2014/0282464 A1* 9/2014 El-Gillani ........ G06F 16/00 713/189
2014/0365313 A1 12/2014 Reese et al.
2015/0100946 A1* 4/2015 Brunswig ........ G06F 11/368 717/124
2015/0223261 A1 8/2015 Bedekar et al.
2015/0242466 A1* 8/2015 Alexander ........ G06F 16/951 707/627
2015/0363424 A1* 12/2015 Strong ........ H04L 67/1095 707/634
2016/0026373 A1* 1/2016 Srivastava ........ G06Q 10/06 715/765
2016/0147559 A1* 5/2016 Weimer ........ G06F 8/76 712/228
2016/0162016 A1 6/2016 Lee et al.
2016/0267018 A1* 9/2016 Shimizu ........ G06F 12/126
2017/0032248 A1 2/2017 Dotan-Cohen et al.
2017/0068588 A1* 3/2017 Pourali ........ H04L 41/0836
2018/0024766 A1* 1/2018 Agetsuma ........ G06F 11/34 711/154
2018/0063137 A1* 3/2018 Kishida ........ H04L 63/0884
2018/0145967 A1* 5/2018 Matsugashita ........ G06F 21/335
2018/0239785 A1* 8/2018 Taguchi ........ G06F 16/21
2018/0314843 A1* 11/2018 Anderson ........ G06F 16/13
2018/0330092 A1* 11/2018 Sniezek ........ G06F 21/57
2019/0043457 A1* 2/2019 Hong ........ G06F 11/3476
2019/0073472 A1* 3/2019 Darmon ........ G06F 21/577
2019/0188384 A1* 6/2019 Tanda ........ G06F 21/566
2019/0243964 A1* 8/2019 Shukla ........ G06F 21/54
2019/0258490 A1* 8/2019 Reed ........ G06F 21/566
2020/0043092 A1 2/2020 Brucato
2020/0073987 A1* 3/2020 Perumala ........ G06F 16/24545
2020/0076769 A1 3/2020 Mishra et al.
2020/0097680 A1* 3/2020 Hay ........ G06F 21/6263
2020/0293650 A1* 9/2020 Lau ........ G06F 21/572
2020/0310942 A1* 10/2020 Nelson ........ G06F 9/45508
2020/0310946 A1* 10/2020 Nelson ........ G06F 9/45558
2020/0311044 A1* 10/2020 Merker ........ G06F 16/289
2020/0344185 A1* 10/2020 Singaraju ........ G06N 3/008
2020/0387627 A1* 12/2020 Kfir ........ G06F 21/6245
2021/0157583 A1* 5/2021 Yuile ........ G06F 9/3005
2021/0226990 A1* 7/2021 Devi ........ H04L 63/1425
2021/0397425 A1* 12/2021 Zwarich ........ H04L 9/0877
2021/0406779 A1 12/2021 Hu et al.
2022/0060391 A1 2/2022 Browne et al.
2022/0108007 A1* 4/2022 Zatutschne-Marom ........ G06F 21/52
2022/0164237 A1* 5/2022 King ........ G06F 8/71
2022/0169140 A1* 6/2022 Yang ........ G06F 9/5027
2022/0182384 A1* 6/2022 Chaman ........ H04L 63/0869
2022/0188704 A1* 6/2022 Aguilar ........ G06N 20/00
2022/0293289 A1 9/2022 Decrop et al.
2022/0308950 A1* 9/2022 Cully ........ G06F 9/45558
2023/0011917 A1* 1/2023 Nakazawa ........ G06F 3/1231
2023/0118478 A1 4/2023 Rajanna
2023/0342849 A1* 10/2023 Doney ........ G06Q 40/04
2023/0419274 A1 12/2023 Williams et al.
2024/0078515 A1 3/2024 Curry et al.
2024/0086250 A1* 3/2024 Trossen ........ G06F 9/5066
2024/0086554 A1* 3/2024 Daughety ........ G06F 21/604
2024/0095375 A1* 3/2024 Kumar ........ G06F 21/54
2024/0146678 A1 5/2024 Diesch et al.
2024/0163108 A1 5/2024 Grube
2024/0202122 A1* 6/2024 Cully ........ G06F 12/0815
2024/0202318 A1* 6/2024 Ambrosi ........ G06F 21/53
2024/0202662 A1* 6/2024 Bunke ........ G06Q 10/10
2024/0232147 A1* 7/2024 Kim ........ G06F 16/245
2024/0385885 A1* 11/2024 Dhillon ........ G06F 9/5027
2024/0394104 A1 11/2024 Tardif
2024/0394369 A1* 11/2024 Tokarev ........ G06F 21/14
2024/0428255 A1* 12/2024 Ito ........ H04L 9/3268
2025/0028867 A1* 1/2025 Nandy ........ G06F 30/27
2025/0071578 A1 2/2025 Zhao et al.
2025/0077198 A1* 3/2025 Cohen ........ G06F 8/41
2025/0103985 A1* 3/2025 Sreeram ........ G06F 3/0482
2025/0225231 A1* 7/2025 Zmijewski ........ G06F 21/53
2025/0245301 A1* 7/2025 Fan ........ G06F 21/14
2025/0307436 A1 10/2025 Doyle et al.
2025/0307538 A1 10/2025 Sarin
2025/0363422 A1* 11/2025 Sharma ........ G06N 20/20
2025/0378383 A1 12/2025 Koh et al.
2025/0384411 A1 12/2025 Krasnyansky
2026/0010773 A1 1/2026 Fortkort
2026/0019438 A1 1/2026 Pickman et al.
2026/0052028 A1* 2/2026 Zohrevandi ........ H04L 9/3247
2026/0067335 A1 3/2026 Tran
2026/0072915 A1* 3/2026 Nitisastro ........ G06F 16/24549
2026/0111292 A1 4/2026 Ast
2026/0119657 A1 4/2026 Zamir et al.
2026/0121859 A1 4/2026 Arkoff et al.
2026/0122112 A1 4/2026 Abotchie
2026/0134441 A1 5/2026 Bickerstaff, III
2026/0134442 A1 5/2026 Bickerstaff, III

* cited by examiner

SYSTEMS AND METHODS FOR DELEGATED AUTHORITY MANAGEMENT, RUNTIME ENFORCEMENT, AND REVOCATION IN AUTONOMOUS COMPUTATIONAL ENTITIES

BACKGROUND

Authorization mechanisms are useful for regulating whether computational entities are permitted to, for example, perform certain operations and/or access certain resources. Such mechanisms support orderly interaction between software components, services, and external systems, particularly where actions are performed on behalf of users, organizations, or other entities.

SUMMARY

Autonomous computational entities, including software agents, artificial intelligence models, machine learning systems, workflows, services, and composite AI architectures, are increasingly capable of proposing and executing machine-actionable operations without direct human intervention. Such operations may include modification of data stores, invocation of external services, initiation of financial transactions, control of infrastructure, or actuation of physical-world systems.

Conventional authorization mechanisms are predominantly identity-centric. These systems rely on credentials, access tokens, roles, or static permissions that authenticate an entity but do not govern whether a specific autonomous action should be executed under evolving contextual, temporal, behavioral, or governance conditions. Once authenticated, an autonomous system may continue executing actions even when circumstances indicate execution should be constrained or revoked.

As autonomous systems persist across time, delegate actions to other systems, and operate across distributed and heterogeneous environments, identity-based authorization models become insufficient. Existing systems lack a mechanism for representing execution authority as a persistent, enforceable, revocable, and machine-interpretable construct that governs autonomous behavior at runtime and propagates across systems independently of authentication state.

Accordingly, there exists a need for systems, methods, and media that enable execution authority to be delegated, constrained, evaluated, modified, and revoked dynamically, prior to and during execution of autonomous actions, in a manner that is enforceable, auditable, and propagable across distributed computing environments.

The present invention provides systems, methods, and media for governing execution authority in autonomous computational entities using machine-executable authority objects evaluated at runtime. In some embodiments, execution authority is represented as a first-class computational construct distinct from identity credentials. An authority object is instantiated in response to a delegation event and is associated with an autonomous computational entity. The authority object encodes execution constraints including scope, context, temporal validity, behavioral thresholds, delegation permissions, attenuation rules, and revocation conditions. Prior to execution of a proposed action, an execution boundary intercepts the action and evaluates the authority object at runtime. The evaluation determines execution eligibility based on one or more authority constraints. Based on the evaluation, execution may be permitted, modified, delayed, attenuated, redirected, or suppressed. Authority objects may be dynamically modified or revoked based on contextual signals, governance policies, regulatory constraints, or behavioral outcomes, and such revocation may propagate across systems without altering authentication state. By separating execution authority from identity authentication and enforcing authority as a runtime-evaluated computational construct, the invention enables safe, scalable, and governable autonomous execution across persistent and distributed artificial intelligence environments. Unlike systems that merely record, audit, or remediate actions after execution, the present system enforces execution authority prior to effect realization.

Described herein is a computer-implemented method comprising receiving, by one or more processors, a request to delegate execution authority to an autonomous computational entity; instantiating an authority object defining machine-executable authority constraints governing execution of actions by the autonomous computational entity; associating the authority object with the autonomous computational entity independently of identity credentials; intercepting, at runtime and prior to execution, a proposed action generated by the autonomous computational entity at an execution boundary; evaluating the authority object against the proposed action, the evaluation comprising determination of execution eligibility based on one or more authority constraints including scope, context, temporal validity, and delegation state; and controlling execution of the proposed action by permitting, modifying, delaying, attenuating, redirecting, or suppressing execution based on the evaluation. In some embodiments, the authority object defines a temporal execution constraint specifying a duration, expiration time, or execution window. In some embodiments, the authority object defines a contextual execution constraint based on environmental, system, or situational data. In some embodiments, the authority object defines a behavioral execution constraint based on historical or predicted behavior of the autonomous computational entity. In some embodiments, the authority object defines delegation permissions specifying whether and how execution authority may be further delegated. In some embodiments, execution authority is delegated across a chain of autonomous computational entities. In some embodiments, delegated execution authority is attenuated at each delegation step to prevent privilege amplification. In some embodiments, the authority object is versioned and persists across multiple execution sessions. In some embodiments, the authority object supports partial revocation of a subset of execution permissions while preserving remaining permissions. In some embodiments, evaluating the authority object occurs at multiple stages including prior to execution and during execution. In some embodiments, execution is suppressed in a fail-closed manner when authority ambiguity is detected. In some embodiments, the authority object is modified dynamically based on contextual or behavioral signals. In some embodiments, the authority object is revoked independently of authentication state. In some embodiments, revocation of the authority object propagates across multiple computing systems. In some embodiments, execution control includes rollback or remediation of effects caused by execution. In some embodiments, execution control generates an audit record associated with the authority object. In some embodiments, execution control generates an accountability record associating executed actions with delegated authority.

Described herein is a system comprising one or more processors and a memory storing instructions that, when executed, cause the system to perform receiving, by the one or more processors, a request to delegate execution authority to an autonomous computational entity; instantiating an authority object defining machine-executable authority constraints governing execution of actions by the autonomous computational entity; associating the authority object with the autonomous computational entity independently of identity credentials; intercepting, at runtime and prior to execution, a proposed action generated by the autonomous computational entity at an execution boundary; evaluating the authority object against the proposed action, the evaluation comprising determination of execution eligibility based on one or more authority constraints including scope, context, temporal validity, and delegation state; and controlling execution of the proposed action by permitting, modifying, delaying, attenuating, redirecting, or suppressing execution based on the evaluation.

Described herein is a non-transitory computer-readable medium storing instructions that, when executed, cause a system to perform receiving, by one or more processors, a request to delegate execution authority to an autonomous computational entity; instantiating an authority object defining machine-executable authority constraints governing execution of actions by the autonomous computational entity; associating the authority object with the autonomous computational entity independently of identity credentials; intercepting, at runtime and prior to execution, a proposed action generated by the autonomous computational entity at an execution boundary; evaluating the authority object against the proposed action, the evaluation comprising determination of execution eligibility based on one or more authority constraints including scope, context, temporal validity, and delegation state; and controlling execution of the proposed action by permitting, modifying, delaying, attenuating, redirecting, or suppressing execution based on the evaluation.

Described herein is a distributed computing system comprising a plurality of autonomous computational entities operating across multiple systems and an authority enforcement layer configured to intercept and control execution of actions using authority objects evaluated at runtime.

Described herein is a computer-implemented method for controlling execution of actions by a computational entity executed at one or more computer processors, the method comprising: receiving, from a delegator, a request to delegate execution authority to a computational entity; generating an authority object comprising one or more authority constraints; associating the authority object with governance of execution of actions generated by the computational entity; intercepting, at runtime, prior to execution, and at an execution boundary, a proposed action generated by the computational entity; evaluating the proposed action based at least on the one or more authority constraints of the authority object; and controlling execution of the proposed action based on the evaluation, wherein controlling execution of the proposed action comprises one or more of: permitting, modifying, delaying, attenuating, redirecting, and suppressing execution of the proposed action. In some embodiments, associating the authority object with the execution of actions generated by the computational entity is done independently of any identity credentials of the computational entity. In some embodiments, associating the authority object with the execution of actions generated by the computational entity is done independently of any identity credentials of the delegator. In some embodiments, the delegator is a second computational entity. In some embodiments, the one or more authority constraints comprise a temporal execution constraint, and wherein the temporal execution constraint specifies a duration, an expiration time, or an execution window. In some embodiments, the one or more authority constraints comprise a contextual execution constraint, and the contextual execution constraint is based on environmental, system, or situational data. In some embodiments, the one or more authority constraints comprise a behavioral execution constraint, and the behavioral execution constraint is based on historical or predicted behavior of the autonomous computational entity. In some embodiments, the one or more authority constraints comprise a delegation permission specifying whether and how execution authority may be further delegated. In some embodiments, the method further comprises associating the authority object with governance of execution of actions generated by one or more additional computational entities. In some embodiments, the one or more additional computational entities are in a delegation chain comprising the computational entity. In some embodiments, the method further comprises attenuating the authority object after associating the authority object with the execution of actions generated by the computational entity or the one or more additional computational entities. In some embodiments, the method further comprising repeating steps of intercepting, evaluating, and controlling, one or more times, and wherein the authority object persists through each repetition. In some embodiments, the method further comprises evaluating the proposed action based on the one or more authority constraints during execution of the proposed action. In some embodiments, the one or more authority constraints are sourced from a CRE. In some embodiments, the method further comprises revoking one or more authority constraints of the authority object while preserving at least one authority constraint. In some embodiments, the method further comprises modifying the authority object based on one or more contextual or behavioral signals. In some embodiments, controlling execution of the proposed action comprises rolling back or remediating one or more effects caused by execution of the proposed action. In some embodiments, the method further comprises generating an audit record associated with the authority object. In some embodiments, the method further comprises generating an accountability record, wherein the accountability record records an effect of the one or more authority constraints on the execution of the proposed action. In some embodiments, the method further comprises sharing the evaluation of the proposed action based on the one or more authority constraints of the authority object across multiple computing systems. In some embodiments, evaluating the proposed action based on the one or more authority constraints is performed across multiple computing systems.

Described herein is a computer-implemented system for controlling execution of actions by a computational entity comprising at least one computer processor and instructions executable by the at least one computer processor to provide an application comprising: an authority management engine configured to receive, from a delegator, a request to delegate execution authority to a computational entity, generate an authority object comprising one or more authority constraints, and associate the authority object with governance of execution of actions generated by the computational entity; and an authority enforcement layer configured to perform operations comprising: intercepting a proposed action generated by the computational entity prior to execution of the proposed action; evaluating the proposed action based on the one or more authority constraints of the authority object; and controlling execution of the proposed action based on the evaluation, wherein controlling execution of the proposed action comprises one or more of:

permitting, modifying, delaying, attenuating, redirecting, and suppressing execution of the proposed action. In some embodiments, the authority management engine is configured to associate the authority object with the execution of actions generated by the computational entity independent of any identity credentials of the computational entity. In some embodiments, the authority management engine is configured to associate the authority object with the execution of actions generated by the computational entity independent of any identity credentials of the delegator. In some embodiments, the delegator is a second computational entity. In some embodiments, the one or more authority constraints comprise a temporal execution constraint. In some embodiments, the one or more authority constraints comprise a contextual execution constraint. In some embodiments, the one or more authority constraints comprise a behavioral execution constraint. In some embodiments, the one or more authority constraints comprise a delegation permission specifying whether and how execution authority may be further delegated. In some embodiments, the authority management engine is further configured to associate the authority object with governance of execution of actions generated by one or more additional computational entities. In some embodiments, the one or more additional computational entities are in a delegation chain comprising the computational entity. In some embodiments, the authority management system is further configured to attenuate the authority object after associating the authority object with the execution of actions generated by the computational entity or the one or more additional computational entities. In some embodiments, the authority layer is further configured to repeat intercepting a proposed action, evaluating the proposed action, and controlling execution of the proposed action at least one or more times, and the authority object persists through each repetition. In some embodiments, the authority layer is further configured to evaluate the proposed action based on the one or more authority constraints during execution of the proposed action. In some embodiments, the one or more authority constraints are sourced from a CRE. In some embodiments, the authority layer is further configured to revoke one or more authority constraints of the authority object. In some embodiments, the authority layer is further configured to modify the authority object based one or more contextual or behavioral signals. In some embodiments, the authority layer is configured to control execution of the proposed action by rolling back or remediating one or more effects caused by execution of the proposed action. In some embodiments, the authority layer is configured to generate an audit record associated with the authority object. In some embodiments, the authority layer is configured to generate an accountability record. In some embodiments, the accountability record records one or more effects of the one or more authority constraints on the execution of the proposed action. In some embodiments, the authority layer is further configured to share the evaluation of the proposed action across multiple computing systems. In some embodiments, the authority layer is configured to evaluate the proposed action across multiple computing systems.

Described herein is a non-transitory computer-readable medium storing instructions that, when executed by one or more computer processors, cause the one or more computer processors to perform operations comprising: receiving a request to delegate execution authority to a computational entity; generating an authority object comprising one or more authority constraints; associating the authority object with the execution of actions generated by the computational entity; intercepting, prior to execution, a proposed action generated by the computational entity; evaluating the proposed action based on the one or more authority constraints of the authority object; and controlling execution of the proposed action based on the evaluation, wherein controlling execution of the proposed action comprises one or more of: permitting, modifying, delaying, attenuating, redirecting, and suppressing execution of the proposed action.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
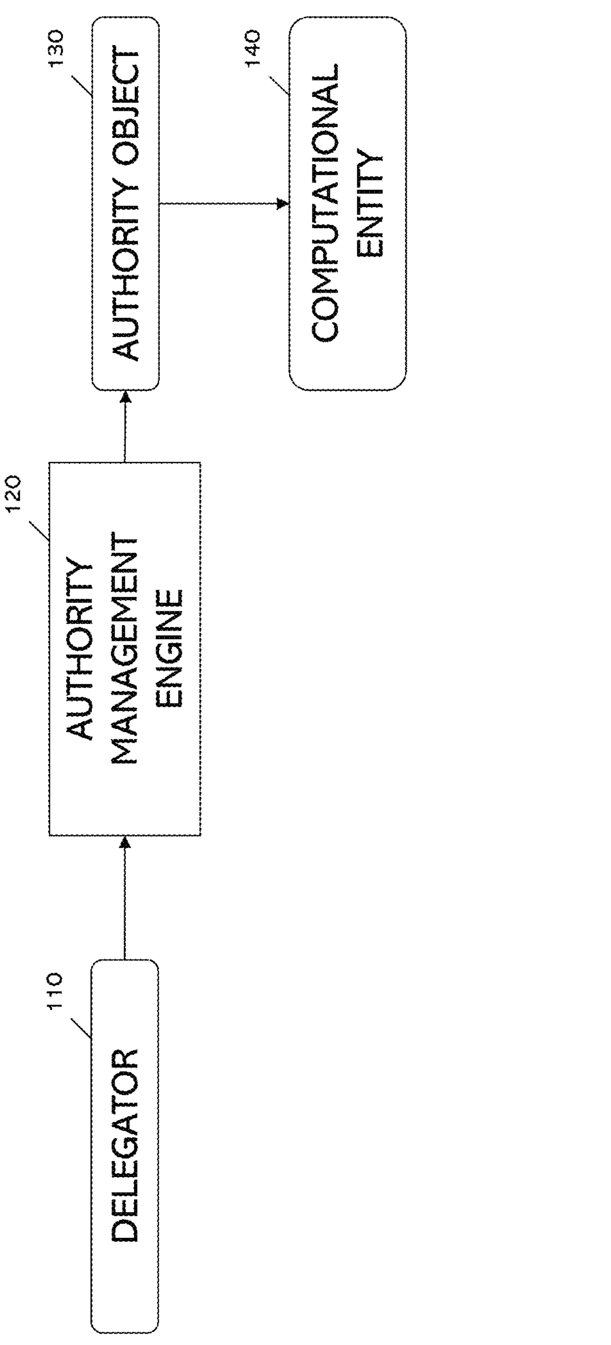
FIG. 1 illustrates an example system flow for generating an authority object.

Described herein are systems, methods, and media for controlling execution of actions by computational entities.

Technical Improvements

The systems, methods, and media described herein improve computer functionality by enforcing execution authority at runtime, prior to effect realization. In particular, the disclosed architecture reduces nondeterministic execution behavior, prevents unauthorized or unsafe machine actions before execution occurs, and eliminates reliance on post-execution rollback, remediation, or audit-only controls. Unlike policy engines or advisory systems, the present invention operates as a runtime execution-control mechanism that governs whether and how computational actions are permitted to produce effects. By determining execution permissibility before computational actions are invoked, the system avoids unnecessary execution of downstream processes and state transitions that would otherwise consume processing, memory, and network resources. This pre-execution enforcement reduces exception-handling overhead and simplifies execution paths, resulting in more predictable and efficient utilization of computing resources across distributed systems.

Delegation

In some embodiments, a request is made to delegate execution authority to a computational entity. The request to delegate execution authority to the computational entity may come from a delegator. In some embodiments, the delegator may be a human user, an automated system, a computational agent, an organizational entity, a service, a device, a workflow engine, or another computational entity authorized to grant execution authority. In some embodiments, the delegator is a trusted upstream system, a partner entity, or a supervisory or administrative component within a multi-entity environment.

In some embodiments, the request to delegate execution authority specifies that the computational entity is authorized to make decisions, select actions, or commit transactions on behalf of the requesting entity. In some embodiments, the request authorizes the computational entity to control or influence one or more downstream systems, services, devices, or processes. In some embodiments, the request is made as part of a negotiation, agreement, handshake, or enrollment process between entities. In some embodiments, the request enables the computational entity to function as an agent, proxy, delegate, or representative with respect to the execution of its generated actions, rather than as a generally authorized entity. In some embodiments, the request explicitly or implicitly transfers responsibility for execution of generated actions from a human or system to an execution mechanism responsive to actions generated by the computational entity. For example, a user or system may submit a request indicating that actions generated by an artificial intelligence model for adjusting resource allocations may be executed within predefined constraints.

In some embodiments, the request to delegate execution authority is generated by another computational entity. In some embodiments, the request is generated automatically. In some embodiments, the request is generated in response to a detected condition, event, state change, or trigger. In some embodiments, the request is generated based on predefined rules, learned behaviors, or historical interactions. In some embodiments, the request includes metadata describing the origin, intent, priority, trust level, or conditions under which execution of actions generated by the computational entity may be authorized.

In some embodiments, the request to delegate execution authority is received. In some embodiments, receiving the request to delegate execution authority comprises obtaining, detecting, intercepting, or otherwise acquiring a communication indicating an intent to transfer, assign, share, or authorize performance of one or more actions by the computational entity. In some embodiments, the request is received via a message, signal, instruction, command, application programming interface (API) call, data structure, or protocol exchange. In some embodiments, the request is received from a user, an external system, another computational entity, or a combination thereof. In some embodiments, the request specifies that execution of actions generated by the computational entity is permitted to initiate, control, modify, or complete one or more operations on behalf of another entity. In some embodiments, the request identifies a scope, boundary, limitation, or condition governing which generated actions may be executed. In some embodiments, receiving the request comprises receiving data that expresses consent, authorization, delegation, or empowerment to execute actions generated by the computational entity. In some embodiments, the request to delegate execution authority pertains to actions affecting at least one external system, resource, process, or environment.

In some embodiments, the computational entity is an autonomous computational entity. In some embodiments, the computational entity is a semi-autonomous computational entity. In some embodiments, the computational entity is a software agent, service, model, workflow, or composite system. In some embodiments, the computational entity operates independently with respect to action generation or initiation. In some embodiments, the computational entity operates continuously. In some embodiments, the computational entity operates intermittently or in response to triggering conditions. In some embodiments, the computational entity operates on behalf of one or more users or organizations. In some embodiments, the computational entity operates within a defined execution environment.

Authority Object

In some embodiments, an authority object is generated or instantiated. In some embodiments, generation of the authority object is in response to receiving a request to delegate execution authority to a computational entity. In some embodiments, the authority object is generated prior to execution of any action generated by the computational entity. In some embodiments, the authority object is generated by an authority management engine. In some embodiments, the authority object is generated automatically without direct human involvement.

In some embodiments, the authority object is a machine-executable data structure. In some embodiments, the authority object is a structured record, serialized object, token, or object instance. In some embodiments, the authority object is configured to reside in a memory local to the computational entity. In some embodiments, the authority object is configured to reside within an authority layer. In some embodiments, the authority object may reside in a distributed store, shared memory, or other storage accessible across runtime execution boundaries. For example, an authority object stored in a distributed database may be accessed by multiple services at runtime to determine whether a requested action is permitted.

In some embodiments, the authority object comprises one or more authority constraints. In some embodiments, the authority constraints define conditions under which execution of actions generated by the computational entity is permitted, restricted, delayed, modified, or denied. In some embodiments, the authority constraints are independent of an identity, role, or persistent privilege associated with the computational entity. In some embodiments, the one or more authority constraints comprise a temporal execution constraint. In some embodiments, the temporal execution constraint specifies a duration during which execution of actions generated or associated with the computational entity is authorized. In some embodiments, the temporal execution constraint specifies an expiration time after which execution of actions is no longer permitted. In some embodiments, the temporal execution constraint specifies an execution window defining one or more time periods during which actions may be executed. For example, an authority object may specify that actions generated by a computational entity are executable only within a predefined maintenance window or only for a limited time.

In some embodiments, the one or more authority constraints comprise a contextual execution constraint. In some embodiments, the contextual execution constraint is based on environmental data, system state data, situational data, or a combination thereof. In some embodiments, the contextual execution constraint authorizes execution of an action generated or initiated by the computational entity only when one or more contextual conditions are satisfied. For example, an authority object may permit execution of actions generated by a computational entity only when a target system is operating below a load threshold or when sensor data indicates a safe operating condition.

In some embodiments, the one or more authority constraints comprise a behavioral execution constraint. In some embodiments, the behavioral execution constraint is based on historical behavior, observed performance, or predicted behavior of the computational entity with respect to previously generated or initiated actions. In some embodiments, the behavioral execution constraint limits execution of actions based on compliance, reliability, error rates, or risk assessments associated with prior actions. For example, an authority object may restrict execution of actions generated by a computational entity if prior generated actions exceeded a predefined error rate or if predicted behavior indicates an elevated risk level.

In some embodiments, the one or more authority constraints comprise a delegation permission. In some embodiments, the delegation permission specifies whether execution authority associated with the authority object may be further delegated. In some embodiments, the delegation permission specifies how, when, or to what extent execution authority for actions may be delegated to another entity, process, or execution system. In some embodiments, the delegation permission restricts delegation to specific action types or contexts.

In some embodiments, one or more of the one or more authority constraints of the authority object are sourced from, derived from, or informed by outputs of a composite relational entity (CRE). In some embodiments, a CRE is a synthesized computational object representing one or more relationships between two or more source entities. The one or more relationships may comprise delegation permissions, scope constraints, attenuation rules, temporal validity, temporal thresholds, behavioral thresholds, conditional or contextual permissions, revocation conditions, and causal or provenance-based constraints between the computational entity and one or more additional entities. In some embodiments, a CRE is a synthesized computational object as described in various embodiments in U.S. patent application Ser. No. 19/413,985, entitled AI SYSTEMS AND METHODS FOR ADAPTIVE CROSS-DOMAIN COMPOSITE RELATIONAL SYNTHESIS AND INTEROPERABILITY, filed on Dec. 9, 2025, and listing as inventor Marc Berger, which is hereby incorporated by reference in its entirety.

Authority Object Association

In some embodiments, the authority object is associated with the computational entity. Association of the authority object with the computational entity is done independently of identity credentials. This may include identity credentials of the computational entity and of the delegator. In some embodiments, association of the authority object with the computational entity comprises association of the authority object with governance of execution of actions generated by the computational entity. In some embodiments, associating the authority object with execution comprises linking, binding, referencing, attaching, or otherwise correlating the authority object to one or more actions generated, initiated, proposed, selected, or attributable to the computational entity. In some embodiments, the association causes execution of an action to be conditioned on evaluation of the authority object. In some embodiments, the authority object is nominally associated with the computational entity, but the association is meaningful only with respect to execution of actions generated or initiated by that entity, and does not grant authority based on the identity of the entity itself. In some embodiments, the authority management engine is configured to associate the authority object with the computational entity.

In some embodiments, the authority object is associated with a stream, class, category, or sequence of actions generated or initiated by the computational entity. For example, an authority object may be associated with a batch of actions generated by a computational entity during a workflow. In some embodiments, the association applies on a per-action basis such that each action generated, initiated, or otherwise attributable to the computational entity is individually evaluated against the authority object. In some embodiments, the association is transient, persistent, revocable, or time-limited. In some embodiments, the association is conditional on contextual, temporal, or behavioral factors. In some embodiments, associating the authority object with execution comprises embedding an identifier, reference, token, or metadata associated with the authority object into a representation of an action generated or initiated by the computational entity.

In some embodiments, the authority object is associated with execution context of the computational entity, such as a process thread, execution environment, container, or workflow instance, so that all actions generated within that context are subject to evaluation. In some embodiments, the authority object is associated based on a provenance or causal chain of actions such that actions generated in response to upstream events inherit the authority object. In some embodiments, runtime policies or dynamic mappings may further associate actions with one or more authority objects based on operational, contextual, or historical factors, independent of identity credentials.

The authority object described herein is distinct from authentication credentials, access control lists, and role-based authorization mechanisms. Authentication establishes identity, whereas the authority object governs execution effects at runtime independently of identity.

In some embodiments, a system described herein comprises an authority layer. In some embodiments, the authority object resides within the authority layer. In some embodiments, the authority layer is configured to associate the authority object with the execution of actions generated by the computational entity. In some embodiments, the authority layer is configured to associate the authority object with execution of actions initiated, proposed, selected, or otherwise attributable to the computational entity. In some embodiments, the authority layer is configured to associate the authority object with individual actions, classes of actions, sequences of actions, or streams of actions. In some embodiments, the association is performed on a per-action basis. In some embodiments, the authority layer is configured to associate the authority object with execution of actions without assigning execution authority to the computational entity itself. In some embodiments, the authority layer is configured to associate the authority object with execution by creating, maintaining, or managing a linkage, reference, binding, tag, or metadata relationship between the authority object and actions generated or initiated by the computational entity. In some embodiments, the association is persistent, transient, conditional, or revocable. In some embodiments, the authority layer is configured to support association of multiple authority objects with different actions or action categories generated or initiated by the same computational entity. In some embodiments, the authority layer is distinct from, coupled to, or integrated with one or more other layers of the system. In some embodiments, the authority layer is configured to associate authority objects independently of an identity, role, or persistent privilege of the computational entity. In some embodiments, the authority layer is configured to associate authority objects based on the execution context of the computational entity, such as a process, thread, container, execution environment, or workflow instance. In some embodiments, the authority layer is configured to associate authority objects based on the provenance or causal chain of actions, such that actions generated in response to delegated requests or upstream events inherit the authority object. In some embodiments, the authority layer is configured to dynamically map authority objects to actions based on contextual, behavioral, temporal, operational, or historical factors.

Computational Entity Action

In some embodiments, a proposed action is initiated by a computational entity. In some embodiments, a proposed action is related to a computational entity. In some embodiments, the proposed action is initiated in response to a computational entity. In some embodiments, the proposed action is generated by a computational entity. In some embodiments, the proposed action is generated in response to a computational entity.

In some embodiments, a proposed action generated by a computational entity is intercepted prior to execution. In some embodiments, a proposed action initiated, proposed, selected, or otherwise attributable to a computational entity is intercepted at runtime, before it is committed, transmitted, or executed within one or more systems or environments. In some embodiments, intercepting a proposed action comprises obtaining, detecting, capturing, receiving, monitoring, or otherwise acquiring the proposed action before it is committed, transmitted, or executed within one or more systems or environments. For example, a system may intercept configuration changes generated by an autonomous planning model before they are applied to a target system. In some embodiments, intercepting a proposed action comprises redirecting, buffering, or tagging the action for subsequent processing or association with an authority object. In some embodiments, the proposed action may be intercepted individually, as part of a sequence of actions, or as part of a batch or stream of actions. In some embodiments, the authority layer is configured to intercept proposed actions generated by a computational entity prior to execution. In some embodiments, the authority layer is configured to obtain, detect, capture, or otherwise acquire each proposed action before it reaches an execution component. In some embodiments, the authority layer is configured to temporarily hold, tag, reference, or otherwise associate intercepted actions with one or more authority objects. In some embodiments, the authority layer is configured to intercept actions individually, in groups, or in streams. For example, an authority layer may be configured to intercept every action generated by a semi-autonomous computational agent before it is transmitted to an external service.

In some embodiments, interception of the proposed action occurs at an execution boundary. An execution boundary may comprise any point at which the proposed action is about to be executed, committed, transmitted, or otherwise applied within a system or environment. For example, an execution boundary may include: the interface between a computational entity and a target system, a function call within a program, a network API invocation, a database write operation, a system command or workflow step, or a message transmission within a distributed system. In some embodiments, the authority layer is configured to intercept proposed actions at one or more such execution boundaries to evaluate authority objects in real time. In some embodiments, multiple execution boundaries may be monitored simultaneously, such that actions are intercepted and evaluated at any of several points in their lifecycle. In some embodiments, the interception may occur before the action is committed, before it is transmitted to other services, or before it modifies any state external to the computational entity. In some embodiments, an execution boundary refers to a machine-enforced control point between action generation and effect realization, at which execution may be permitted, modified, delayed, or suppressed prior to producing irreversible system effects.

In some embodiments, a proposed action is intercepted in conjunction with associating an authority object. In some embodiments, the authority object is associated with the action prior to the interception, such that the action or class of action is already linked, tagged, referenced, or bound to the authority object when it is intercepted. In some embodiments, the authority object is associated with the action after interception of the action. In some embodiments, all actions are first intercepted and then authority objects are associated with the corresponding actions based on the source computational entity. For example, a system may first intercept a proposed command generated by a semi-autonomous agent and then associate the authority object with the intercepted action before it is transmitted to a downstream device. In some embodiments, interception and association occur automatically, continuously, intermittently, or in response to triggering conditions.

Evaluation

In some embodiments, the proposed action generated or initiated by the computational entity is evaluated based on one or more authority constraints of an authority object. In some embodiments, evaluating the proposed action comprises determining whether the action satisfies one or more conditions, rules, thresholds, or limitations of the one or more authority constraints. In some embodiments, evaluation is performed automatically. In some embodiments, a system described herein comprises an authority layer configured to evaluate proposed actions based on one or more authority constraints of an authority object. In some embodiments, the proposed action is evaluated based on the one or more authority constraints prior to execution. In some embodiments, the proposed action is evaluated based on the one or more authority constraints during execution of the proposed action.

In some embodiments, evaluation is performed for each action individually. In some embodiments, evaluation is performed for sequences or streams of actions. In some embodiments, evaluation is performed for batches of actions. In some embodiments, a proposed action is evaluated against one or more temporal constraints, including expiration times, execution windows, or maximum allowable durations for execution. In some embodiments, the proposed action is evaluated against one or more contextual constraints, including environmental conditions, system state, operational parameters, situational data, or external sensor inputs. In some embodiments, the proposed action is evaluated against one or more behavioral constraints, including historical performance of the computational entity, predicted behavior, compliance with prior execution rules, or assessed risk associated with the action. In some embodiments, evaluation comprises determining whether delegation permissions associated with the authority object allow the proposed action to be further delegated to another entity, workflow, or execution component. In some embodiments, evaluation comprises comparing attributes of the proposed action, such as action type, target system, parameters, side effects, or resource requirements, against corresponding constraints from the authority object. In some embodiments, evaluation is performed before execution of the proposed action. In some embodiments, evaluation is performed at the time of submission of the proposed action. In some embodiments, evaluation is performed immediately after interception of the proposed action. In some embodiments, evaluation is performed without modifying the content, structure, or intended outcome of the proposed action. In some embodiments, evaluation is performed continuously, intermittently, periodically, or in response to a triggering event or system state change.

In some embodiments, the evaluation of the proposed action based on the one or more authority constraints of the authority object is shared across multiple computing systems. In some embodiments, authority constraints, evaluation states, intermediate results, or final determinations are communicated, synchronized, or made accessible to two or more computing systems. In some embodiments, evaluating the proposed action based on the one or more authority constraints is performed across multiple computing systems. In some embodiments, evaluation is distributed such that different computing systems evaluate different authority constraints, subsets of constraints, or different aspects of the proposed action. In some embodiments, one or more computing systems perform a preliminary or partial evaluation, and one or more additional computing systems perform further evaluation or final determination of execution control. In some embodiments, evaluation results, intermediate decisions, or authority-related signals are communicated between computing systems to coordinate enforcement of authority constraints. In some embodiments, evaluation may be performed redundantly or in parallel across multiple computing systems. In some embodiments, evaluation is performed synchronously or asynchronously across computing systems.

Controlling Execution

In some embodiments, execution of the proposed action generated or initiated by the computational entity is controlled based on an evaluation of one or more authority constraints contained in an associated authority object. In some embodiments, the evaluation of the authority constraints directly informs how the execution of the proposed action is controlled. In some embodiments, controlling execution of the proposed action comprises permitting execution of the action. In some embodiments, execution of the proposed action is permitted if the proposed action satisfies one or more of the one or more authority constraints. In some embodiments, execution of the proposed action is permitted if the proposed action satisfies each of the one or more authority constraints. For example, a proposed action generated by an autonomous computational entity may be permitted to execute if it satisfies all temporal and contextual constraints specified in an associated authority object.

In some embodiments, controlling execution comprises modifying the proposed action, in response to evaluation of the authority object. In some embodiments, modifying the proposed action comprises altering parameters, adjusting target systems, or limiting scope or intensity. In some embodiments, modifying the proposed action constrains execution of the proposed action to permitted effects and does not allow a prohibited action, effect, or state transition to proceed. In some embodiments, controlling execution comprises delaying execution of the proposed action. In some embodiments, delaying execution of the proposed action comprises queuing, buffering, or scheduling the action for later execution. In some embodiments, the proposed action is delayed until certain temporal, contextual, or situational constraints are satisfied. In some embodiments, the evaluation of the authority object can trigger modifications or delays of the proposed action depending on whether the proposed action partially or fully satisfies the authority constraints.

In some embodiments, controlling execution comprises attenuating the effect of the proposed action. In some embodiments, attenuating the effect of the proposed action comprises reducing the magnitude, frequency, or resource usage of the proposed action. In some embodiments, attenuating the effect of the proposed action is based on the results of evaluating the authority constraints, allowing fine-grained action-specific control. For example, a proposed data transfer action generated by a computational entity may be attenuated to reduce bandwidth usage. In some embodiments, controlling execution comprises redirecting the proposed action to an alternate target, system, workflow, or execution path. For example, a proposed data transfer action generated by a computational entity may be redirected to a backup server if the original server is under maintenance.

In some embodiments, controlling execution comprises suppressing execution of the proposed action. In some embodiments, the proposed action is suppressed when one or more constraints from the authority object are not satisfied. In some embodiments, suppressing execution of the proposed action comprises preventing or halting execution of the proposed action at runtime, including preventing execution prior to initiation or terminating execution in progress. In some embodiments, the proposed action is suppressed when all of the constraints from the authority object are not satisfied. In some embodiments, whether a proposed action is suppressed is determined directly based on the outcome of evaluating the authority constraints, such that the evaluation identifies which constraints are violated and then the action is blocked. In some embodiments, suppression may be applied selectively or partially, such that specific elements or sub-actions of a proposed action are blocked while others are allowed to proceed, depending on which authority constraints are satisfied. In some embodiments, where evaluation of an authority object yields an indeterminate, conflicting, or incomplete result, execution of the proposed action is suppressed by default, such that execution proceeds only upon an affirmative authorization outcome.

In some embodiments, controlling execution is performed by the authority layer. In some embodiments, controlling execution occurs individually for each proposed action, for batches or streams of actions, or for sequences of related actions. In some embodiments, controlling execution occurs automatically, continuously, intermittently, or in response to triggering events or changes in system state. In some embodiments, controlling execution is performed without modifying the underlying intent or structure of the proposed action beyond the adjustments required to satisfy authority constraints. For example, a proposed command generated by a semi-autonomous agent to adjust operational parameters of a device may be delayed until sensor readings indicate a safe operating condition, or may be attenuated to reduce power or intensity in response to environmental constraints.

In some embodiments, controlling execution of the proposed action comprises rolling back or remediating one or more effects caused by the execution of the proposed action. In some embodiments, rolling back the proposed action comprises reversing changes to a system state, data, configuration, or external resources affected by the action. In some embodiments, rollback may be partial or selective, such that only specific effects or portions of the action are undone. In some embodiments, remediating the effects of a proposed action comprises applying compensating actions, corrective updates, or alternative operations to restore a desired or safe state. In some embodiments, remediation may be automated or triggered based on evaluation of authority constraints. In some embodiments, remediation occurs immediately after execution, after detection of undesired effects, or asynchronously in response to monitoring or auditing processes. In some embodiments, rollback or remediation propagates across multiple systems, computational entities, or delegated actions, such that effects of downstream actions are also addressed. In some embodiments, remediation is be combined with attenuation or modification of one or more authority objects to prevent recurrence of undesired actions. In some embodiments, multiple remediation strategies may be employed in combination, including alerting, quarantining, compensatory operations, or transactional rollback mechanisms.

Delegation Chain

In some embodiments, an authority object associated with execution of actions generated or initiated by a computational entity is associated with governance of execution of actions generated by one or more additional computational entities. In some embodiments, the authority object is associated with the one or more additional computational entities directly or indirectly through delegation or inheritance mechanisms. In some embodiments, the one or more additional computational entities are organized in a delegation chain, wherein authority is passed from an upstream entity to downstream entities based on one or more rules, conditions, or constraints. In some embodiments, the computational entity and the one or more additional entities are organized in a delegation chain. The delegation chain may comprise multiple layers of delegation, parallel branches, or hierarchical structures. In some embodiments, the authority object is first associated with the computational entity and then associated with the one or more additional computational entities. In some embodiments, the authority object is attenuated as it is associated with multiple computational entities in a delegation chain such that one or more authority constraints of the authority object are modified based on a position in the delegation chain. In some embodiments, the authority object is partially replicated, segmented, or scoped differently for each computational entity within a delegation chain. In some embodiments, the association of the authority object with the one or more additional computational entities is conditional based on attributes of the computational entities, environmental context, operational state, or prior actions. In some embodiments, multiple authority objects are combined, merged, or selectively applied to multiple computational entities.

Modification

In some embodiments, the authority object is modified. In some embodiments, modifying the authority object comprises revoking or removing one or more authority constraints. In some embodiments, modifying the authority object comprises adding, updating, or changing at least one authority constraint. In some embodiments, modifying the authority object comprises attenuating, limiting, or reducing the scope, context, or permissions of at least one of the one or more authority constraints. In some embodiments, modifying the authority object comprises temporarily disabling or suspending at least one of the one or more authority constraints. In some embodiments, modifying the authority object comprises restoring a disabled authority constraint. In some embodiments, modifying the authority object comprises splitting, segmenting, or partitioning the authority object into multiple authority objects. In some embodiments, modifying the authority object comprises merging, combining, or consolidating multiple authority objects into a single authority object. In some embodiments, modifying the authority object comprises updating the authority object based on contextual, temporal, behavioral, or environmental factors. In some embodiments, modifying the authority object comprises dynamically adjusting authority constraints in response to evaluation of execution history, compliance rules, or performance thresholds.

Multiple Actions

In some embodiments, the computational entity proposes multiple actions. In some embodiments, each of the proposed actions is evaluated and execution of each action is controlled. In some embodiments, the authority object persists through each evaluation of each action. In some embodiments, the authority object may be dynamically updated or modified between evaluations of individual actions, such as by attenuating, adding, or revoking authority constraints based on prior evaluations or contextual factors. In some embodiments, the proposed actions are evaluated individually, in groups, or as part of a batch or stream of actions, with evaluation and control applied at each level. In some embodiments, different authority objects or different constraints within the same authority object govern different actions.

Record

In some embodiments, an audit record is associated with the authority object. In some embodiments, the audit record is generated when the authority object is generated. In some embodiments, the audit record is generated in real time, periodically, or in response to specific events or triggers. In some embodiments, the audit record captures information about actions evaluated against the authority object, including proposed actions, execution outcomes, and evaluation results. In some embodiments, the audit record captures temporal information, such as timestamps of when the action was proposed, evaluated, and executed or blocked. In some embodiments, the audit record captures contextual information, including execution context, computational entity identity, relationships with other entities, and environmental or system conditions. In some embodiments, the audit record is stored persistently, transiently, or in a distributed or centralized store. In some embodiments, the audit record is linked to the authority object. In some embodiments, the audit records from multiple authority objects or multiple computational entities may be aggregated, correlated, or analyzed. In some embodiments, the audit record includes metadata describing modifications to the authority object. In some embodiments, the audit record supports automated or semi-automated review.

In some embodiments, an accountability record is generated. In some embodiments, an accountability record is generated in real time, at scheduled intervals, or in response to specific events. In some embodiments, the accountability record records an effect of one or more authority constraints of an authority object on the execution of a proposed action. In some embodiments, the accountability record captures which specific authority constraints were applied, how they influenced the execution, and whether the proposed action was permitted, modified, delayed, attenuated, redirected, or suppressed. In some embodiments, the accountability record captures temporal information, including when the proposed action was evaluated, when constraints were enforced, and when any resulting execution occurred. In some embodiments, the accountability record captures contextual information, such as the computational entity that generated the action, the execution context, relationships to other entities, delegation chains, or environmental conditions. In some embodiments, the accountability record is correlated with one or more audit records. In some embodiments, the accountability record includes metadata describing modifications, attenuation, or revocation of authority constraints. In some embodiments, the accountability record is stored persistently, transiently, locally, or in a distributed or centralized repository. In some embodiments, the accountability record is linked to the authority object or other records. In some embodiments, the accountability record is used for compliance, verification, reporting, auditing, governance, or automated review.

In some embodiments, post-execution recording, logging, audit, remediation, or rollback mechanisms are non-authoritative and do not retroactively permit or legitimize an execution that was not authorized at runtime.

Overview

Referring to FIG. 1, in this example, execution authority is delegated to a computational entity 140 through a delegation event initiated by a delegator 110. The delegator 110 may be a human operator, governance system, policy engine, regulatory controller, or another computational entity. The delegator 110 initiates the delegation event by sending a delegation request to an authority management engine 120. The authority management engine 120 is configured to receive the delegation request and in response instantiate an authority object 130. The authority management engine 120 is then configured to associate the authority object 130 with the autonomous computational entity 140 independently of identity credentials. The authority object 130 defines authority constraints related to proposed action initiated or generated by the computational entity 140. The authority object 130 may be versioned, partially revocable, and persist across execution sessions.

Figure 2:
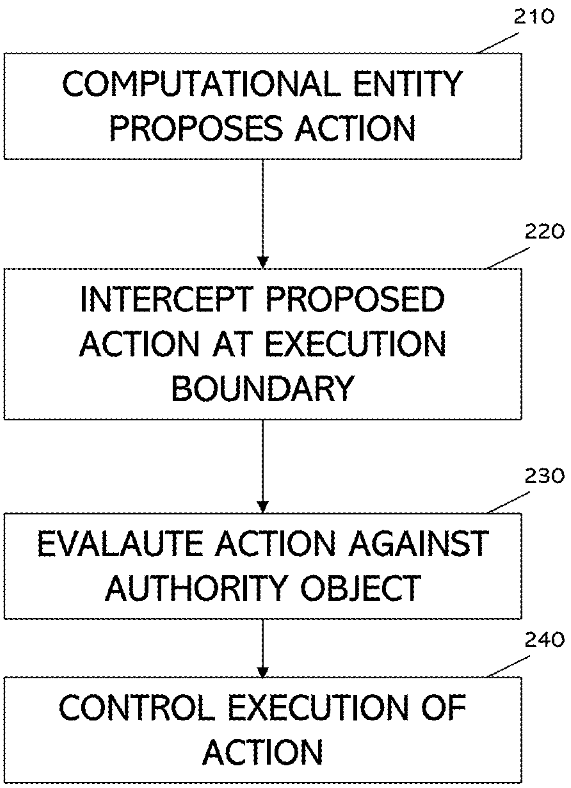
FIG. 2 illustrates an example method for controlling execution of actions by a computational entity.

Referring to FIG. 2, the autonomous computational entity first proposes an action 210, which is intercepted at an execution boundary 220 prior to execution. The proposed action is then evaluated at runtime against the authority object 230 associated with the computational entity. This evaluation 230 considers the authority constraints of the object, which may include scope compliance, contextual validity, temporal eligibility, delegation state, and behavioral thresholds. Based on the evaluation 230, execution control 240 is applied, which may permit execution, modify execution parameters, attenuate execution scope, delay execution, suppress execution, or fail execution in a fail-closed manner. Evaluation 230 may occur before, during, or after partial execution of the proposed action.

Figure 3:
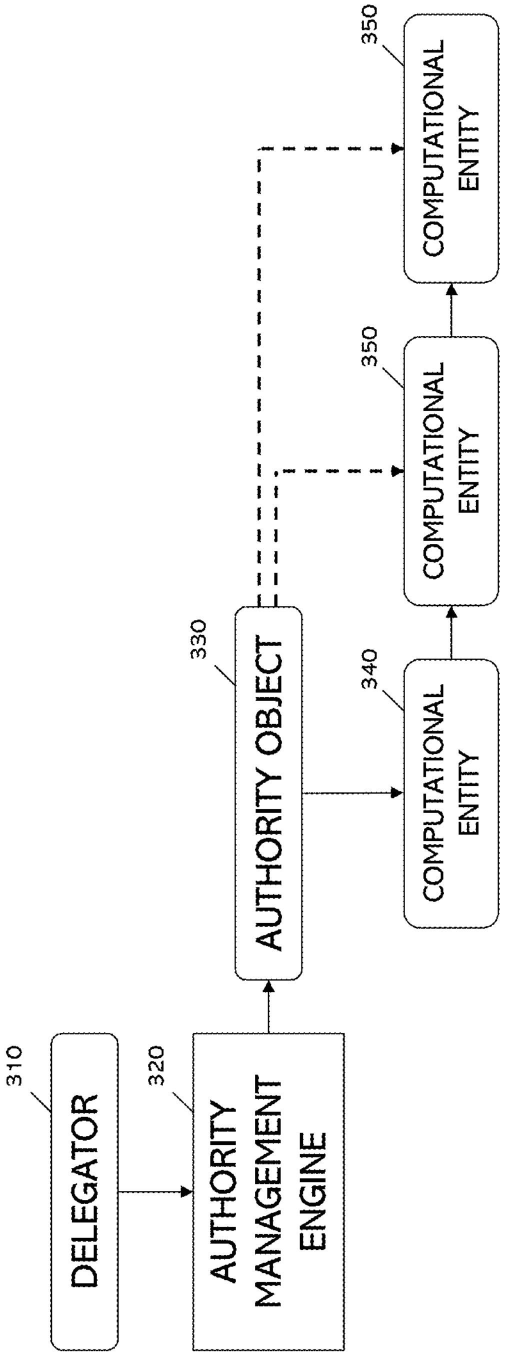
FIG. 3 illustrates an example system for delegated execution authority across a chain of computational entities.

Referring to FIG. 3, execution authority may be delegated across chains of computational entities. The delegator 310 sends a delegation request to the authority management engine 320 which instantiates an authority object 330. The authority management engine 320 is configured to associate the authority object 330 with a first computational entity 340. The first computational entity 340 is in a delegation chain with subsequent computational entities 350 and 360. Delegation between the computational entities 340, 350, 360 along the chain may be conditioned on authority constraints within the authority object 330. In addition, the authority object 330 may be associated with the other computational entities 350, 360 in the delegation chain. In some embodiments, the authority from the authority object 330 is attenuated when applied to the downstream computational entities 350, 360.

Figure 4:
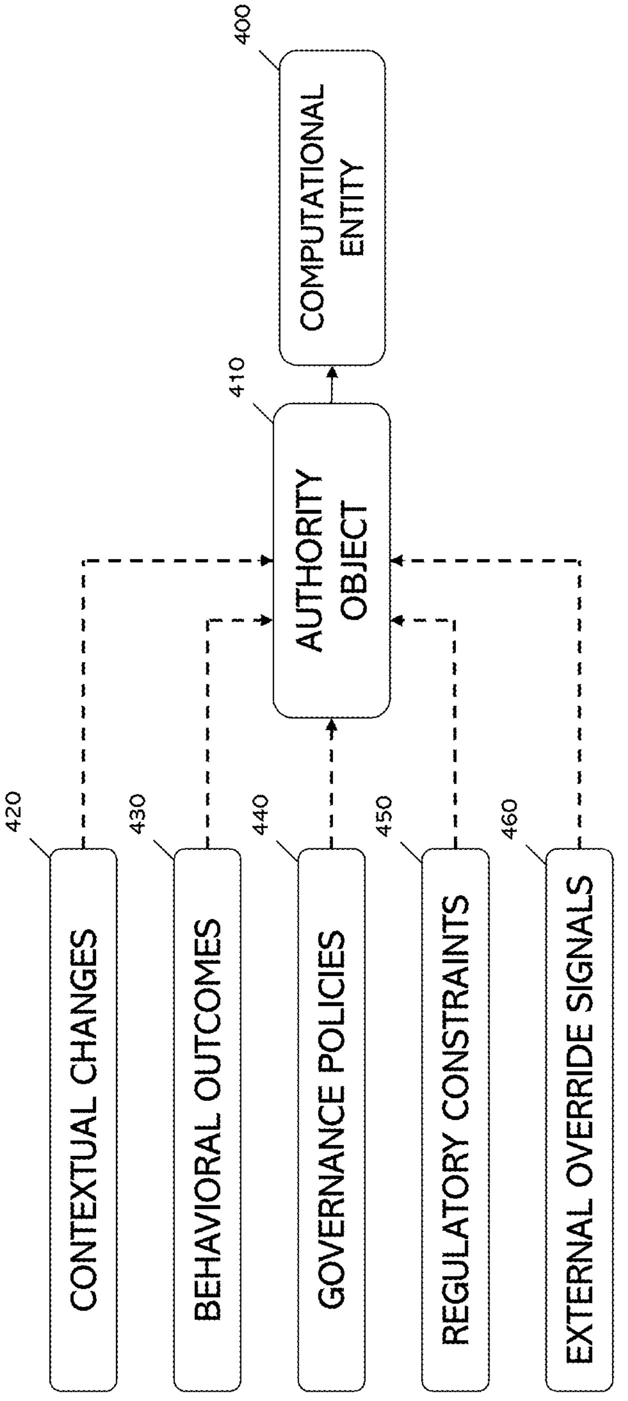
FIG. 4 illustrates an example of a modified authority object.

Referring to FIG. 4, an authority object 410 is associated with a computational entity 400. The authority object 410 may be dynamically modified or revoked based on contextual changes 420, behavioral outcomes 430, governance policies 440, regulatory constraints 450, or external override signals 460. Modification of the authority object 410 may result in changes in how the authority object is associated with the computational entity 400. Modification or revocation of the authority object 410 may result in changes to the permissions or execution capabilities of the computational entity 400. In addition, revocation or modification may propagate across other systems or downstream computational entities to suppress pending or future proposed actions. Such events may also generate audit and accountability records, ensuring traceability of changes to the authority object and maintaining compliance with governance or regulatory requirements.

In one illustrative embodiment, an authority object governs execution of financial transaction requests in a distributed payment processing system. Proposed transaction executions generated by one or more transaction services are intercepted at an execution boundary and evaluated against authority constraints defining transaction limits, counterparties, and temporal conditions. Transactions failing authority evaluation are suppressed prior to settlement, while permitted transactions are executed in accordance with the evaluated constraints. This embodiment illustrates that the execution-control mechanisms described herein apply broadly to machine execution control beyond autonomous agents or artificial intelligence systems.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

The term "engine" as used herein refers to any computational, logical, algorithmic, or procedural component configured to perform one or more operations, functions, or analyses described herein. The term includes, without limitation, artificial intelligence models, machine learning models, neural networks, statistical models, or any adaptive or rule-based system configured to generate, process, or analyze data. Unless otherwise indicated, the term "engine" encompasses both trained models and dynamically learning systems.

The term "computational entity" as used herein refers to any software-based agent, process, model, service, system, or combination thereof configured to generate, evaluate, propose, influence, initiate, or execute one or more actions, operations, or decisions. The term includes, without limitation, artificial intelligence systems, automated agents, services, workflows, orchestration components, and composite or distributed computational systems.

The term "action" as used herein refers to any operation, instruction, transaction, communication, signal, or representation capable of producing an externally observable effect on a system, resource, user, or other entity, whether such effect occurs immediately or at a later time.

The term "execution boundary" as used herein refers to a point in a workflow that delineates a transition between stages of processing, planning, authorization, or execution of an action. An execution boundary may correspond to a point before, during, or immediately prior to execution of an action, and may serve as a reference point at which one or more operations, evaluations, or controls may be applied.

Computing System

Figure 5:
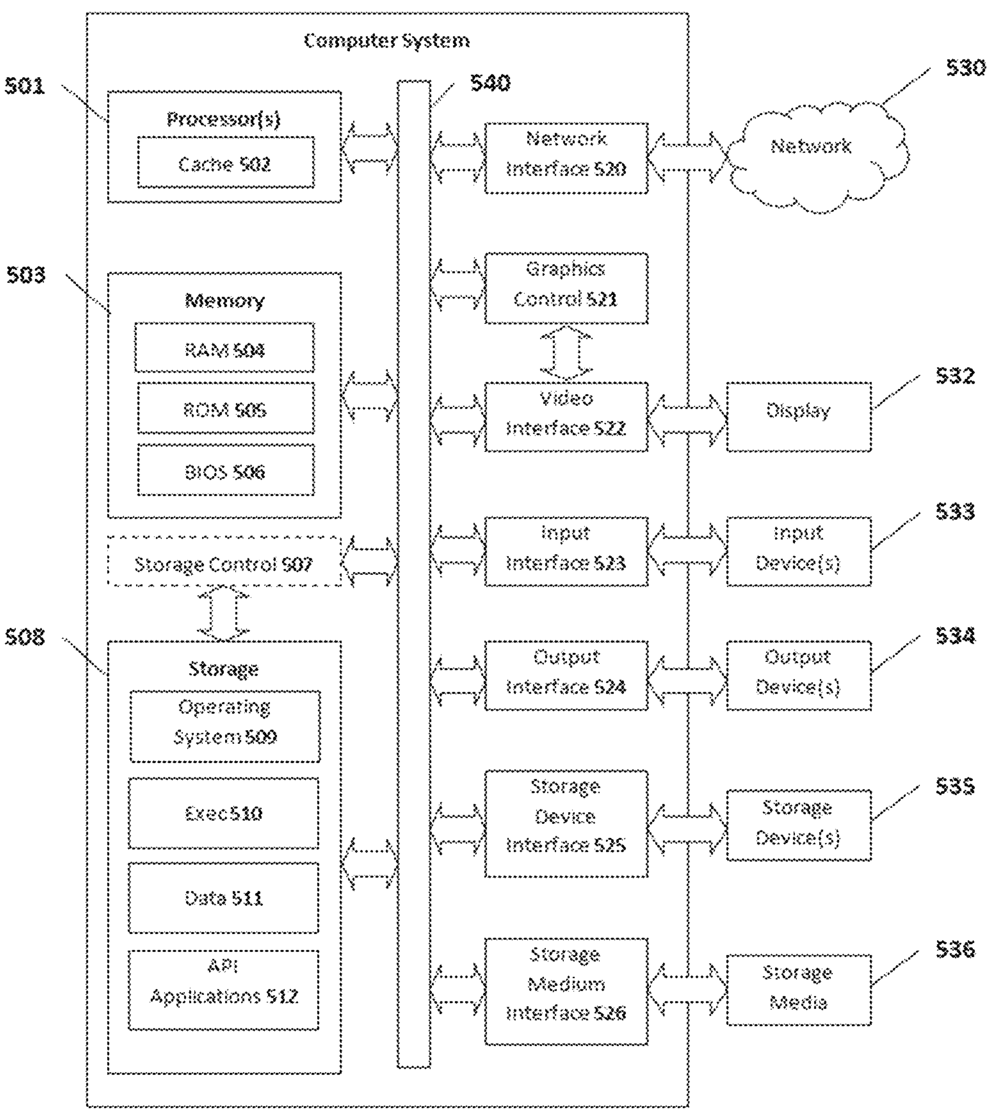
FIG. 5 shows a non-limiting example of a computing device; in this case, a device with one or more processors, memory, storage, and a network interface.

Referring to FIG. 5, a block diagram is shown depicting an exemplary machine that includes a computer system 500 (e.g., a processing or computing system) within which a set of instructions can execute for causing a device to perform or execute any one or more of the aspects and/or methodologies for static code scheduling of the present disclosure. The components in FIG. 5 are examples only and do not limit the scope of use or functionality of any hardware, software, embedded logic component, or a combination of two or more such components implementing particular embodiments.

Computer system 500 may include one or more processors 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 500 includes one or more processor(s) 501 (e.g., central processing units (CPUs), general purpose graphics processing units (GPGPUs), or quantum processing units (QPUs)) that carry out functions. Processor(s) 501 optionally contains a cache memory unit 502 for temporary local storage of instructions, data, or computer addresses. Processor(s) 501 are configured to assist in execution of computer readable instructions. Computer system 500 may provide functionality for the components depicted in FIG. 5 as a result of the processor(s) 501 executing non-transitory, processor-executable instructions embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., static RAM (SRAM), dynamic RAM (DRAM), ferroelectric random access memory (FRAM), phase-change random access memory (PRAM), etc.), a read-only memory component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, executable(s) 510, data 511, applications 512 (application programs), and the like. Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide non-volatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, distributed computing systems, cloud storage systems, cloud computing systems, and the like, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 530, may employ a wired and/or a wireless mode of communication. In general, any network topology may be used.

Information and data can be displayed through a display 532. Examples of a display 532 include, but are not limited to, a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 532, computer system 500 may include one or more other peripheral output devices 534 including, but not limited to, an audio speaker, a printer, a storage device, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, cloud computing platforms, distributed computing platforms, server clusters, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS® Google® Android®, Microsoft® Windows Phone® OS, Microsoft® Windows Mobile® OS, Linux® and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari® Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM Blackberry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of psychometric, behavioral, contextual, relationship, demographic, and observational information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the applications, systems, and methods described herein and are not meant to be limiting in any way.

Example 1—Action Execution Governed by a Delegated Authority Object

In one illustrative embodiment, a system described herein controls execution of action generated by a computational entity operating in an autonomous or semi-autonomous environment. A delegator, such as a supervisory entity or administrative user, submits a request to delegate execution authority to the computational entity. In response, the system generates an authority object comprising one or more authority constraints. These authority constraints include the permitted action types that may be taken by the computational entity and how long those action types will be permitted.

The system associates the authority object with governance of execution of actions generated by the computational entity. The association is independent of identity credentials and applies to actions proposed by the computational entity during execution. In this example, associating the authority object comprises linking the authority object to an execution context in which the computational entity operates, such that actions proposed within that context are subject to evaluation under the authority constraints. The association does not grant standing authority to the computational entity itself, but instead conditions execution of each proposed action on evaluation of the authority object at runtime.

In this example, the computational entity operates as an automated service responsible for managing tasks within a computing environment. As part of its operation, the computational entity generates a proposed action to modify a system parameter in response to a detected condition. Prior to execution of the proposed action, the system intercepts the proposed action at runtime and at an execution boundary corresponding to an interface through which such changes are applied.

The interception occurs before the proposed action is committed to the target system, allowing the system to evaluate the proposed action without relying on identity-based access control. The system evaluates the proposed action based on the authority constraints encoded in the authority object, including whether the proposed parameter modification is within the permitted action types, whether the delegation is temporally valid, and whether any contextual constraints apply to the current execution environment.

The evaluation then determines that the proposed action is partially permitted based on the authority object. Based on this determination, the system controls execution of the proposed action by modifying the action to limit its scope to a subset of system parameters authorized by the authority constraints. The modified action is then permitted to execute and any unauthorized portions of the original proposed action are suppressed.

In this example, the system generates an accountability record describing how the authority constraints influenced the execution of the proposed action. The accountability record includes which constraints were applied and how the proposed action was modified.

Example 2—Action Execution Governed by a Delegated Authority Object

In another illustrative embodiment, execution authority is delegated to a first autonomous computational entity operating as a coordinator for a distributed task. The first autonomous computational entity is responsible for coordinating data analysis and external reporting tasks. An authority object is instantiated and associated with the first computational entity. The authority object specifies which datasets are accessible and the conditions under which access is revoked.

During execution, the first computational entity delegates a subset of execution authority to a second autonomous computational entity to perform a downstream task. The second computational entity is configured to generate a report, and the authority object is attenuated for the second computational entity such that only a limited subset of actions may be executed. As a result, the second computational entity is explicitly prohibited by the delegated authority from submitting the report to an external system or modifying certain records.

While the second computational entity is in the process of proposing actions under the delegated authority, the system detects a policy rule violation, which is a contextual condition indicating that continued execution may violate a governance constraint. In response, the authority object is modified at runtime to revoke a subset of execution permissions.

The revocation propagates across the delegation chain and is enforced at execution boundaries associated with both computational entities. Propagation occurs such that modifications to a parent authority are reflected in all active delegated authorities. Pending proposed actions generated by the second computational entity are intercepted prior to execution and suppressed based on the updated authority object, without modifying authentication credentials or terminating the entities themselves.

In this example, execution control is enforced dynamically, prior to execution of the proposed actions, and across multiple computing systems. An accountability record is generated associating the suppressed actions with the revoked authority constraints, and the authority object persists in a modified state for subsequent evaluations. The accountability record includes identifiers for the proposing computational entity, the suppressed submission action, the governing policy constraint, and a timestamped reference to the modified authority object version.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method for controlling execution of actions by a computational entity executed at one or more computer processors, the method comprising:

(a) receiving, from a delegator, a request to delegate execution authority to a computational entity;

(b) generating an authority object comprising one or more authority constraints;

(c) associating the authority object with governance of execution of actions generated by the computational entity;

(d) intercepting, at runtime, prior to execution, and at an execution boundary, a proposed action generated by the computational entity;

(e) evaluating the proposed action based at least on the one or more authority constraints of the authority object; and (f) controlling execution of the proposed action based on the evaluation, wherein controlling execution of the proposed action comprises one or more of: permitting, modifying, delaying, attenuating, redirecting, and suppressing execution of the proposed action.

2. The method of claim 1, wherein associating the authority object with the execution of actions generated by the computational entity is done independently of any identity credentials of the computational entity.

3. The method of claim 1, wherein associating the authority object with the execution of actions generated by the computational entity is done independently of any identity credentials of the delegator.

4. The method of claim 1, wherein the delegator is a second computational entity.

5. The method of claim 1, wherein the one or more authority constraints comprise a temporal execution constraint, and wherein the temporal execution constraint specifies a duration, an expiration time, or an execution window.

6. The method of claim 1, wherein the one or more authority constraints comprise a contextual execution constraint, and wherein the contextual execution constraint is based on environmental, system, or situational data.

7. The method of claim 1, wherein the one or more authority constraints comprise a behavioral execution constraint, and wherein the behavioral execution constraint is based on historical or predicted behavior of the autonomous computational entity.

8. The method of claim 1, wherein the one or more authority constraints comprise a delegation permission specifying whether and how execution authority may be further delegated.

9. The method of claim 1, further comprising associating the authority object with governance of execution of actions generated by one or more additional computational entities.

10. The method of claim 9, wherein the one or more additional computational entities are in a delegation chain comprising the computational entity.

11. The method of claim 10, further comprising attenuating the authority object after associating the authority object with the execution of actions generated by the computational entity or the one or more additional computational entities.

12. The method of claim 1, further comprising repeating steps (d)-(f) one or more times, and wherein the authority object persists through each repetition.

13. The method of claim 1, further comprising evaluating the proposed action based on the one or more authority constraints during execution of the proposed action.

14. The method of claim 1, wherein the one or more authority constraints are sourced from a CRE.

15. The method of claim 1, further comprising revoking one or more authority constraints of the authority object while preserving at least one authority constraint.

16. The method of claim 1, further comprising modifying the authority object based on one or more contextual or behavioral signals.

17. The method of claim 1, wherein controlling execution of the proposed action comprises rolling back or remediating one or more effects caused by execution of the proposed action.

18. The method of claim 1, further comprising generating an audit record associated with the authority object.

19. The method of claim 1, further comprising generating an accountability record, wherein the accountability record records one or more effect of the one or more authority constraints on the execution of the proposed action.

20. The method of claim 1, further comprising sharing the evaluation of the proposed action based on the one or more authority constraints of the authority object across multiple computing systems.

21. The method of claim 1, wherein evaluating the proposed action based on the one or more authority constraints is performed across multiple computing systems.

22. A computer-implemented system for controlling execution of actions by a computational entity comprising at least one computer processor and instructions executable by the at least one computer processor to provide an application comprising:

(a) an authority management engine configured to perform operations comprising:

i) receive, from a delegator, a request to delegate execution authority to a computational entity, ii) generate an authority object comprising one or more authority constraints, and iii) associate the authority object with governance of execution of actions generated by the computational entity; and (b) an authority enforcement layer configured to perform operations comprising:

i) intercepting a proposed action generated by the computational entity prior to execution of the proposed action;

ii) evaluating the proposed action based at least on the one or more authority constraints of the authority object; and iii) controlling execution of the proposed action based on the evaluation, wherein controlling execution of the proposed action comprises one or more of: permitting, modifying, delaying, attenuating, redirecting, and suppressing execution of the proposed action.

23. A non-transitory computer-readable medium storing instructions that, when executed by one or more computer processors, cause the one or more computer processors to perform operations comprising:

(a) receiving, from a delegator, a request to delegate execution authority to a computational entity;

(b) generating an authority object comprising one or more authority constraints;

(c) associating the authority object with the execution of actions generated by the computational entity;

(d) intercepting, prior to execution, a proposed action generated by the computational entity;

(e) evaluating the proposed action based at least on the one or more authority constraints of the authority object; and (f) controlling execution of the proposed action based on the evaluation, wherein controlling execution of the proposed action comprises one or more of: permitting, modifying, delaying, attenuating, redirecting, and suppressing execution of the proposed action.

* * * * *